United States Patent
Ma et al.

(10) Patent No.: US 9,244,886 B1
(45) Date of Patent: *Jan. 26, 2016

(54) MINIMUM RESOURCE FAST FOURIER TRANSFORM

(71) Applicant: THE MATHWORKS, INC., Natick, MA (US)

(72) Inventors: Jing Ma, Shrewsbury, MA (US); Brian K. Ogilvie, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/091,547

(22) Filed: Nov. 27, 2013

Related U.S. Application Data (63) Continuation of application No. 12/471,197, filed on May 22, 2009, now Pat. No. 8,612,505.

(60) Provisional application No. 61/080,385, filed on Jul. 14, 2008.

(51) Int. Cl.
    *G06F 17/14* (2006.01)
    *G06F 15/00* (2006.01)

(52) U.S. Cl.
    CPC .................. *G06F 17/142* (2013.01)

(58) Field of Classification Search
    CPC .................. G06F 17/142
    See application file for complete search history.

(56) References Cited

U.S. PATENT DOCUMENTS

| | | | |
|---|---|---|---|
| 5,086,498 A | 2/1992 | Tanaka et al. | |
| 5,491,652 A * | 2/1996 | Luo et al. | 708/404 |
| 7,164,723 B2 | 1/2007 | Sunwoo | |
| 7,395,293 B1 | 7/2008 | Szedo et al. | |
| 7,831,649 B2 | 11/2010 | Cho et al. | |
| 7,996,453 B1 | 8/2011 | Leung | |
| 2005/0146978 A1 | 7/2005 | Lee | |
| 2005/0177608 A1 | 8/2005 | Lee | |
| 2007/0260660 A1 | 11/2007 | Su | |
| 2008/0066046 A1 | 3/2008 | Ogilvie et al. | |

OTHER PUBLICATIONS

Co-pending U.S. Appl. No. 12/471,197, filed May 22, 2009, entitled "Minimum Resource Fast Fourier Transform" by Jing Ma et al., 42 pages.

(Continued)

*Primary Examiner* — Marc Somers
(74) *Attorney, Agent, or Firm* — Harrity & Harrity, LLP (57) ABSTRACT

A minimum resource FFT design may calculate the FFT for an input data series using minimal logic resources to implement the FFT. In one implementation, the FFT design may include a butterfly component for performing one or more complex addition and multiplication operations and outputting a plurality of results; a first memory coupled to the butterfly component, the first memory including a number of memory banks equal in number to the number of the plurality of the results; a second memory coupled to the butterfly component, the second memory including a number of memory banks equal in number to a number of the plurality of the results; and a control component to control reading and writing from the first and second memories and the butterfly component using a ping-pong access technique that reads and writes intermediate values to the first and second memories to implement the FFT.

20 Claims, 9 Drawing Sheets

(56) References Cited

OTHER PUBLICATIONS

Xilinx, Inc., "Fast Fourier Transform—v3.1", DS260, Nov. 11, 2004, 36 pages.

Fast Fourier Transform (FFT), http://www.cmlab.csie.ntu.edu.tw/cml/dsp/training/coding/transform/fft.html, printed on May 22, 2009, 14 pages.

* cited by examiner

| CLOCK | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| STAGE | INITIALIZATION | | | | | | 1 | | | | | | 2 | | | | | | | 3 | | | | | | |
| ADDS | | | | | | | | A1 | A2 | A3 | A4 | | | | A5 | A6 | A7 | A8 | | | | A9 | A10 | A11 | A12 | |
| MULTS | | | | | | | | | | | | | | M5 | M6 | M7 | M8 | | | | M9 | M10 | M11 | M12 | | |
| WRITE1 | 0 | | 4 | 6 | 1 | 5 | 3 | 7 | 0 | 2 | 4 | 6 | 2 | 3 | 0 | 1 | 2 | 4 | 5 | 4 | 5 | 6 | 7 | | | |
| WRITE2 | | | | | | | 0 | 2 | 1 | 3 | 5 | 7 | | | 6 | 7 | 3 | 6 | 7 | | | | | | | |
| READ1 | | | | | | | 1 | 3 | 4 | 5 | 6 | 7 | 3 | 0 | 1 | 2 | 3 | 4 | 5 | | 0 | 1 | 2 | 3 | | |
| READ2 | | | | | | | 6 | 7 | 5 | 7 | 3 | 5 | 2 | 4 | 6 | 7 | | | | | | | | | | |
| DATA_IN | 0 | 1 | 2 | 3 | 4 | 5 | 6 | 7 | | | | | | | | | | | | | | | | | | |

| CLOCK | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| ADDS | | | | | | | | A1 | A2 | A3 | A4 | | | A5 | A6 | A7 | A8 | | | A9 | A10 | A11 | A12 | | | |
| MULTS | | | | | | | | | | | | M5 | M6 | M7 | M8 | | | M9 | M10 | M11 | M12 | | | | | |
| WRITE1 | 0 | 4 | 6 | | 1 | 5 | 3 | 7 | 0 | 2 | 4 | 6 | | 0 | 1 | 4 | 5 | | | 0 | 1 | 2 | 3 | | | |
| WRITE2 | | 2 | | | | | 0 | 2 | 1 | 3 | 5 | 7 | | 2 | 3 | 6 | 7 | | | | 5 | 6 | 7 | | | |
| READ1 | | | | | | | 1 | 3 | 4 | 6 | 2 | 0 | 6 | 4 | | | 4 | 5 | 1 | 2 | | | | | | |
| READ2 | | | | | | | | | 5 | 7 | | 3 | 1 | 7 | 5 | | | 0 | 6 | 7 | 3 | | | | | |
| DATA_IN | 0 | 1 | 2 | 3 | 4 | 5 | 6 | 7 | | | | | | | | | | | | | | | | | | |

Fig. 10

MINIMUM RESOURCE FAST FOURIER TRANSFORM

CROSS REFERENCE TO RELATED APPLICATION

The instant application is a continuation of U.S. patent application Ser. No. 12/471,197, filed May 22, 2009, which claims priority under 35 U.S.C. §119 from U.S. Provisional Application Ser. No. 61/080,385, filed Jul. 14, 2008, the disclosures of which are incorporated by reference herein in their entirety.

BACKGROUND

Technical computing environments are known that present a user, such as a scientist or engineer, with an environment that enables users to perform analysis, visualize data, and to model, develop, test and analyze systems. Technical computing environments may allow a user to efficiently and quickly perform tasks such as research and product development.

Technical computing environments may be textual and/or graphical. For example, in one existing technical computing environment, graphical simulation tools allow models to be built by connecting graphical blocks, where each block may represent some functionality and/or data manipulation.

Models built with the blocks may be simulated and/or deployed to a physical system. A model of a circuit, for example, may be automatically converted into a hardware description language (HDL) file, which may be used to synthesize the circuit corresponding to the model.

Blocks that are used to in models may be distributed with the technical computing environment or custom-developed by users. One class of blocks may include blocks that calculate a Discrete Fourier Transform (DFT). A DFT decomposes a sequence of values into components of different frequencies. The DFT has seen wide usage across a large number of fields, including spectral analysis and data compression.

A Fast Fourier Transform (FFT) is an efficient algorithm to compute the DFT and its inverse. A hardware implementation of an FFT can take on many forms. One class of FFT circuits is known as minimum resource FFT implementations. In a minimum resource FFT implementation, it is desirable to compute the FFT efficiently using relatively few hardware resources.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Implementations described herein relate to a minimum resource FFT design that may be implemented in a physical circuit or used in a modeling environment (ME), such as a graphical modeling environment and/or a textual modeling environment. Using minimal logic resources to implement an FFT may provide a valuable trade off between design sizes and calculation time in hardware design. The minimum resource FFT may include two memories, each having multiple memory banks, and a single butterfly component to perform the complex multiplications and additions required for the FFT. Control logic may implement a ping-pong memory access pattern for the two memories using an addressing scheme that is computed on-line by the FFT design using a relatively simple address calculation scheme.

System Description

Models described herein may be created in a modeling environment (ME) and may represent an executable model of a design. The ME may also allow for simulation of a created model, and may accordingly function as a modeling and/or simulation environment. The ME may incorporate or be part of a technical computing environment that may include any hardware, or combination of hardware and software, based logic that provides a computing environment that allows users to perform tasks related to disciplines, such as, but not limited to, mathematics, science, engineering, medicine, business, etc.

The ME may further provide additional functionality and/or blocks (e.g., for creating plots, surfaces, images, volumetric representations, etc.). In an implementation, the ME may provide these functions and/or tools using toolboxes (e.g., toolboxes for signal processing, image processing, data plotting, parallel processing, etc.). In another implementation, the ME may provide these functions as block sets. In still another implementation, the ME may provide these functions in another way, such as via a library, etc.

The ME may implement an environment that provides for the creation of models that are defined by users to implement desired functionality. Certain aspects of the ME, as it relates to the creation of models, will be described in more detail below.

Figure 1:
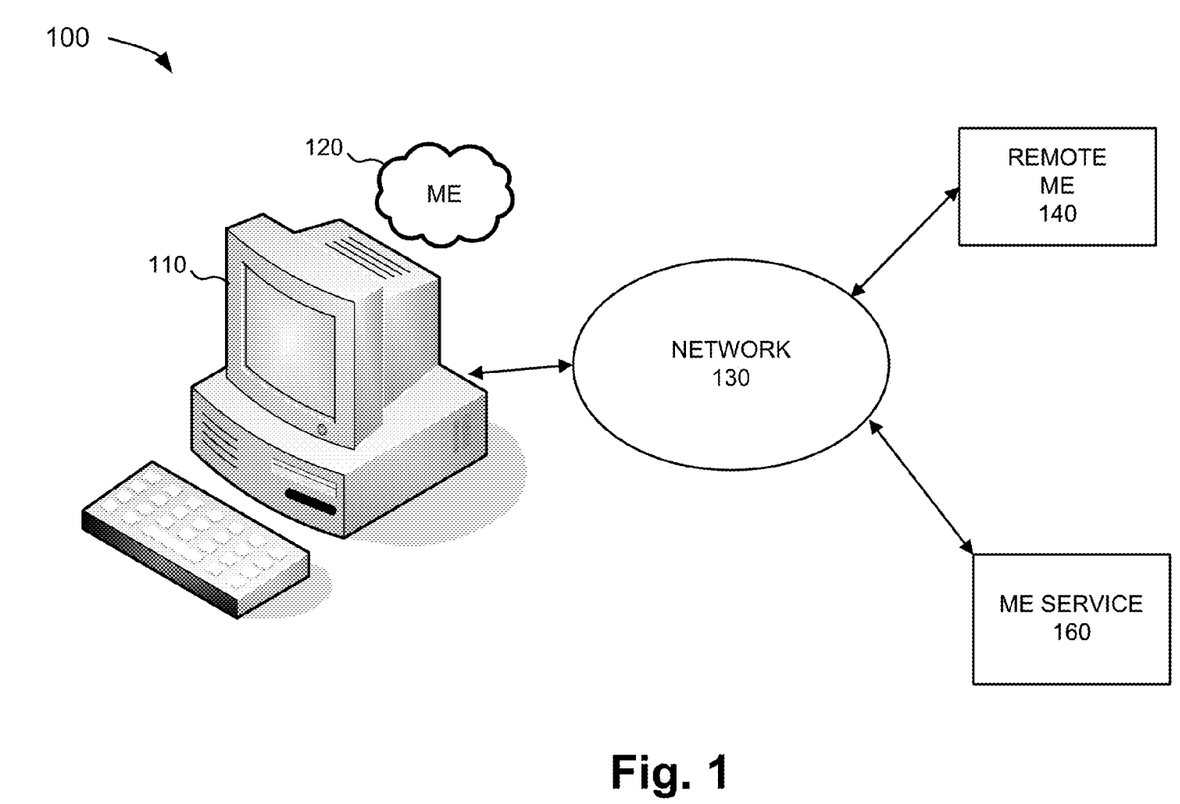
FIG. 1 is an exemplary diagram of a system in which concepts described herein may be implemented.

FIG. 1 is an exemplary diagram of a system 100 in which concepts described herein may be implemented. System 100 may include a personal computer or workstation 110. Workstation 110 may execute a modeling environment (ME) 120 that presents a user with an interface that enables efficient analysis and generation of technical applications. For example, ME 120 may provide a numerical and/or symbolic computing environment that allows for matrix manipulation, plotting of functions and data, implementation of algorithms, creation of user interfaces, and/or interfacing with programs in other languages.

Workstation 110 may operate as a single detached computing device. Alternatively, workstation 110 may be connected to a network 130, such as a local area network (LAN) or wide area network (WAN) such as the Internet. When workstation 110 is connected to a network, ME 120 may be run by multiple networked computing devices or by one or more remote computing devices. In such an implementation, ME 120 may be executed in a distributed manner, such as by executing on multiple computing devices simultaneously. Additionally, in some implementations, ME 120 may be executed over network 130 in a client-server relationship. For example, workstation 110 may act as a client that communicates with, using a web browser, a server that stores and potentially executes the ME program.

For example, as shown in FIG. 1, system 100 may include a remote ME 140 (e.g., a remotely located computing device running a ME) and/or a ME service 160. ME service 160 may include a server computing device that provides a ME as a remote service. For instance, a ME may be provided as a web service. The web service may provide access to one or more programs provided by ME service 160.

Figure 2:
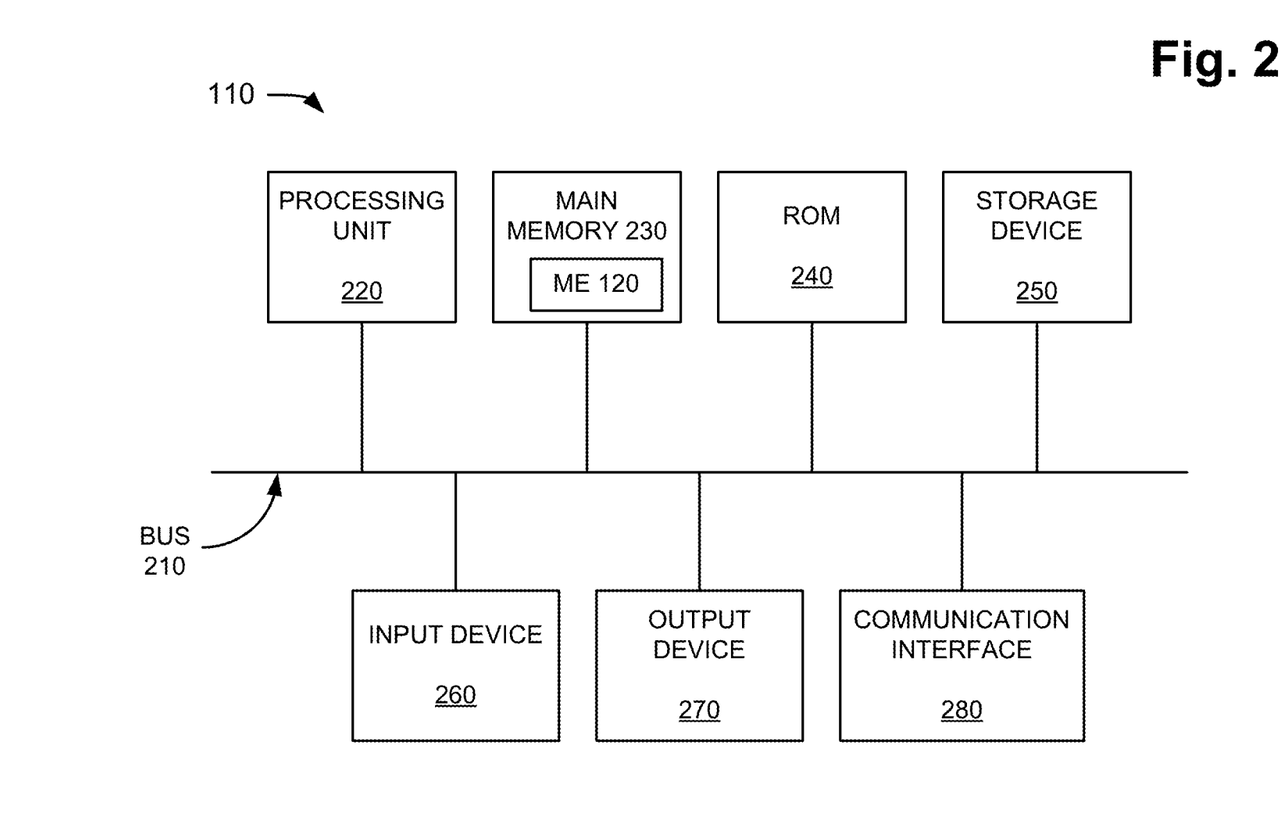
FIG. 2 is a diagram of an exemplary device corresponding to a workstation or device running at a remote modeling environment (ME)

FIG. 2 is a diagram of an exemplary device corresponding to workstation 110 or a remote device running remote ME 140 or ME service 160. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to workstation 110, such as a keyboard, a mouse, a pen, a single or multi-point interface such as a touchpad, a microphone, an accelerometer, gyroscope, a neural interface, voice recognition and/or biometric mechanisms, etc. Output device 270 may include a mechanism that outputs information to the operator, including a display, a printer, a speaker, etc. Communication interface 280 may include any transceiver-like mechanism that enables workstation 110 to communicate with other devices and/or systems. For example, communication interface 280 may include mechanisms for communicating with another device or system via a network, such as network 130.

As will be described in detail below, workstation 110 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. For instance, workstation 110 may implement ME 120 by executing software instructions from main memory 230. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of workstation 110, in other implementations, workstation 110 may contain fewer, different, differently arranged, or additional components than depicted in FIG. 2. In still other implementations, one or more components of workstation 110 may perform one or more tasks performed by one or more other components of workstation 110.

ME 120 may be particularly used to create models that represent hardware circuits. The models may be made of functional blocks, where at least one of the blocks or a combination of blocks represents a minimum resource FFT design.

Figure 3A:
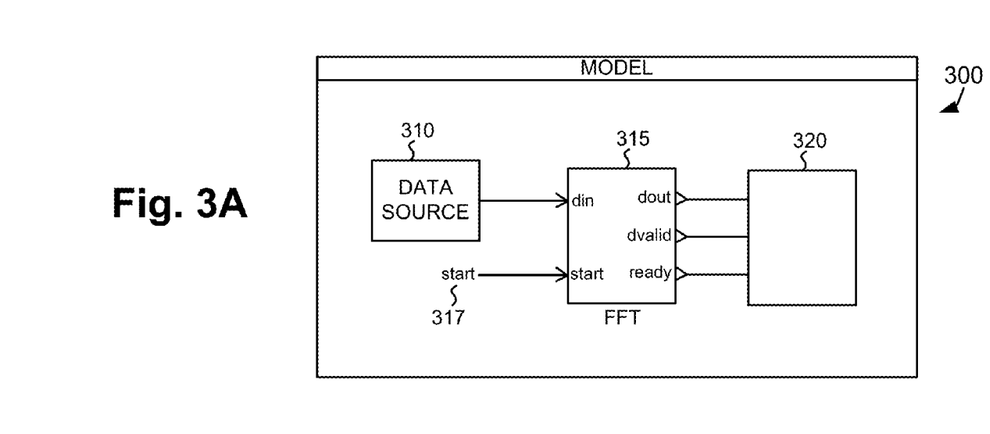
FIG. 3A is a diagram illustrating an exemplary model created with a ME.

FIG. 3A is a diagram illustrating an exemplary model 300 created with ME 120. Model 300 may be constructed from a number of graphical blocks 310-320, as shown in FIG. 3. Each of blocks 310-320 may represent functionality that is to be implemented in model 300. Blocks 310-320 may be graphically placed in model 300 by the user from block libraries, where each block in a block library may be a block designed by the manufacturer of ME 120, a third party, or the user of ME 120.

A "block" as this term is used herein, generally refers to a portion of functionality that may be used in a model. Although blocks will be generally described herein as functionality for a model that is graphically represented, it can be appreciated that a block does not necessarily need to be represented graphically. Also, the particular visual depiction used to represent a block is generally an arbitrary design choice.

Model 300 is shown as a model that includes three blocks: a data source block 310, a minimum resource FFT block 315, and a block 320. Data source block 310 may represent a data source that generates a sampled time signal for which an FFT is to be performed. Minimum resource FFT block 315 may represent logic for performing an FFT operation on the data input from data source block 310. Minimum resource FFT block 315 may begin to perform an FFT operation in response to activation of a "start signal" 317. Minimum resource FFT block 315 may output a number of signals, including output FFT data ("dout"), a signal ("dvalid") indicating when dout includes valid data, and a signal ("ready"), which may indicate when FFT block 315 is ready to process a new data series. Block 320 may represent a block that consumes the FFT data. Block 320 may represent, for instance, one or more blocks that use the FFT data for spectral analysis, data compression, or any other technique that uses FFT data.

A model, such as model 300, can be used in a number of ways. For example, ME 120 may provide for the simulation of model 300 on a general purpose computer. When model 300 represents a hardware circuit, ME 120 may compile the model to generate an output file that describes a hardware implementation of the circuit. For example, ME 120 may output a hardware description language (HDL) file that describes an electronic circuit. A manufacturer may use the HDL file to fabricate physical hardware (e.g., a semiconductor circuit) that implements the model, including the design for the minimum resource FFT described herein.

Figure 3B:
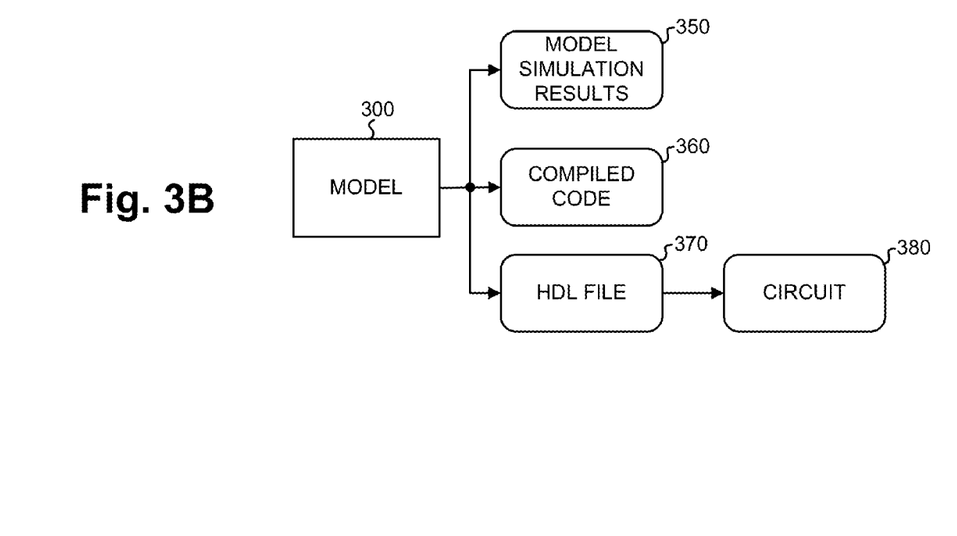
FIG. 3B is a diagram illustrating exemplary results and/or implementations of a model.

FIG. 3B is a diagram illustrating results and/or embodiments of model 300. As previously discussed, ME 120 may simulate model 300 on, for example, a general purpose computer. Model simulation results 350 may include results of the simulation of model 300. Compiled code 360 may include code that is compiled for execution in a particular target environment, such as in an environment using one or more processors on which the final model is expected to execute. HDL file 370 may include a file describing a hardware implementation of model 300. HDL file 370 may be used to generate a hardware circuit 380, which may include, for example, a semiconductor circuit manufactured to include the circuit elements described by model 300.

HDL is generally known in the art, and may be stored as standard text-based expressions of the spatial and temporal structure and behavior of electronic systems. HDL syntax and semantics may include explicit notations for expressing time and concurrency. HDL file 370 may be used to write executable specifications of hardware, such as the minimum resource FFT described herein.

Minimum Resource FFT Design

Figure 4:
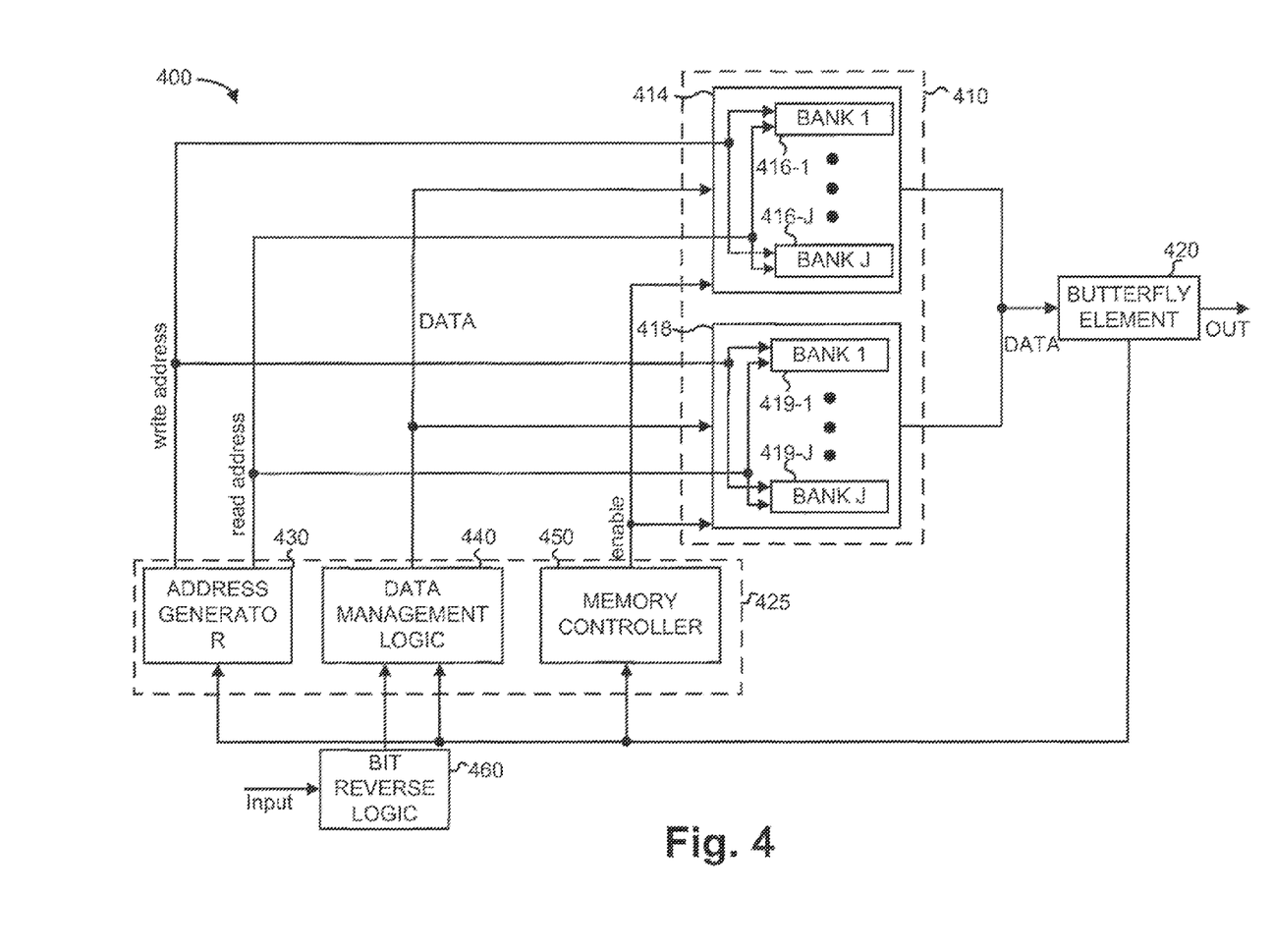
FIG. 4 is a block diagram illustrating an exemplary minimum resource FFT.

FIG. 4 is a block diagram illustrating an exemplary minimum resource FFT 400. FFT 400 may include a memory component 410; a butterfly element 420, which operates on data output from memory component 410; a control component 425; and bit reverse logic 460. Control component 425 may include an address generator 430, data management logic 440, and a memory controller 450. In general, butterfly element 420 may perform the calculations required to perform the FFT operation. Data input from memory component 410 may be processed by butterfly element 420 and the results written back into memory component 410. Address generator 430, data management logic 440, and memory controller 450 may generally control the reading and writing from memory component 410 and butterfly element 420 to efficiently read and write data to memory component 410 in order to calculate the FFT.

Memory component 410 may include two separate memories, memory 414 and memory 418. Each memory 414 and 418 may include, for example, dual-port random access memory (RAM), such as semiconductor-based RAM. Memory 414 may further include a number of memory banks, 416-1 through 416-J (collectively, memory banks 416). Memory 418 may similarly include a number of memory banks 419-1 through 419-J.

Memories 414 and 418 may be accessed in memory component 410 using a "ping-pong" addressing scheme in which, during odd FFT stages, data may be written to a first of memories 414/418 while being simultaneously read from the second of memories 414/418, and during even stages (i.e., stages 2, 4, etc.), data may be read from the first of memories 414/418 while being simultaneously written to the second of memories 414/418. The meaning of "odd" FFT stages and "even" FFT stages is illustrated below with reference to FIG. 7.

The number of banks, J, implemented in each of memories 414/418 may vary based on the type of FFT being implemented. For example, for a radix-2 FFT, at least two banks (J=2) may be used. For a radix-4 FFT, at least four banks (J=4) may be used. In a radix-2 FFT, each butterfly operation requires two input values and generates two output values, while for a radix-4 FFT, each butterfly operation requires four input values and generates four output values. In general, higher radix FFT operations may be implemented using additional memory banks, where the number of memory banks is equal to, or potentially greater than, the number of inputs/outputs generated by the butterfly operation. Each bank 416 or 419 may provide storage for at least N/2 values, where N is the length of the input data sequence.

Figure 5:
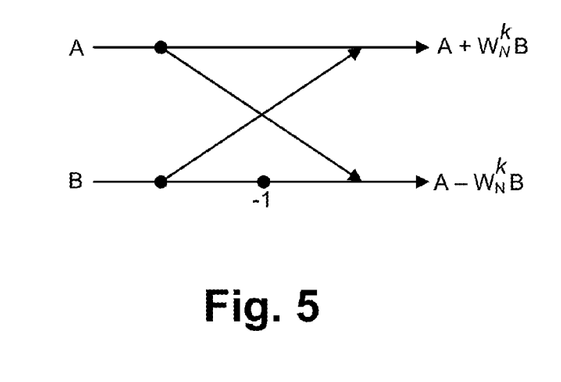
FIG. 5 is a diagram graphically illustrating a radix-2 butterfly operation.

Butterfly element 420 may implement an FFT butterfly operation on its input data values. A radix-2 butterfly operation, for instance, requires up to one complex multiplication and two complex addition operations. FIG. 5 is a diagram graphically illustrating a radix-2 butterfly operation. As shown, two input values "A" and "B" are used to generate two output values: $A+W_N^K B$ and $A-W_N^K B$. $W_N^K$ may represent a multiplication factor that depends on the number of input data elements (N) and the index (K) of the FFT coefficient being calculated. $W_N^K$ may be pre-calculated ahead of time for all possible values of N and K that may occur during the calculation of the FFT. In one implementation, when writing to memories 414/418, for radix-2 operations, one bank may receive the result of the addition operation $(A+W_N^K B)$ while the other bank may receive the result of the subtraction $(A-W_N^K B)$.

Address generator 430 may include logic to generate the appropriate read and write addresses for memory component 410 during the FFT operation. For each clock cycle, address generator 430 may generate a read address for one of memories 414/418 and a write address for the other of memories 414/418. As will be described in more detail below, memories 414/418 may be controlled to alternate reading and writing of data during different stages of the FFT operation. During a particular read/write memory cycle, the address input to memories 414/418 may be the same address in each of the J banks in the memory (i.e., banks 416-1 through 416-J or 419-1 through 419-J).

In one implementation, address generator 430 may generate the read and write addresses using an addressing scheme that requires relatively non-complex logic to calculate the addresses. For instance, the write address may be the value of a counter and the read addresses may be determined based on addition and shift operations applied to the value of the counter. In this manner, address generator 430 may be implemented using relatively simple circuitry, such as a counter, a shift register, and addition circuitry.

Data management logic 440 may generally act to forward data output from butterfly element 420 to memory component 410. Additionally, data initially input to FFT 400, after processing by bit reverse logic 460, may be forwarded by data management logic 440 to memory component 410.

Memory controller 450 may include logic to coordinate the control of memory component 410, address generator 430, and data management logic 440. For example, memory controller 450 may control whether a particular memory 414/418 is write enabled. The write enable signal may be used to choose valid data between the memory outputs.

Address generator 430, data management logic 440, and memory controller 450 may generally operate to control the timing and order at which data is read from memory component 410 for processing by butterfly element 420 and read from the output of butterfly component and written back to memory component 410. Accordingly, address generator 430, data management logic 440, and memory controller 450 may, in the aggregate, function as a control component 425 for FFT 400. Addresses calculated by address generator 430 to control the reading/writing of memory component 410 may be generated on-line (i.e., dynamically during the computation of the FFT) using relatively simple logic. By simultaneously reading data from memory component 410 and writing data to memory component 410, the FFT can be efficiently computed in a manner that generally maximizes the use of butterfly element 420.

Bit reverse logic 460 may operate during an initialization of the FFT to receive the input data (i.e., the input samples for which the FFT is to be calculated) and pre-process the data before sending it to data management logic 440 for writing to memory component 410. In particular, the input data samples for the FFT may need to be re-ordered before efficiently computing the DFT. The re-ordering may be based on a bit reversal of the indexes of the input data.

Figure 6:
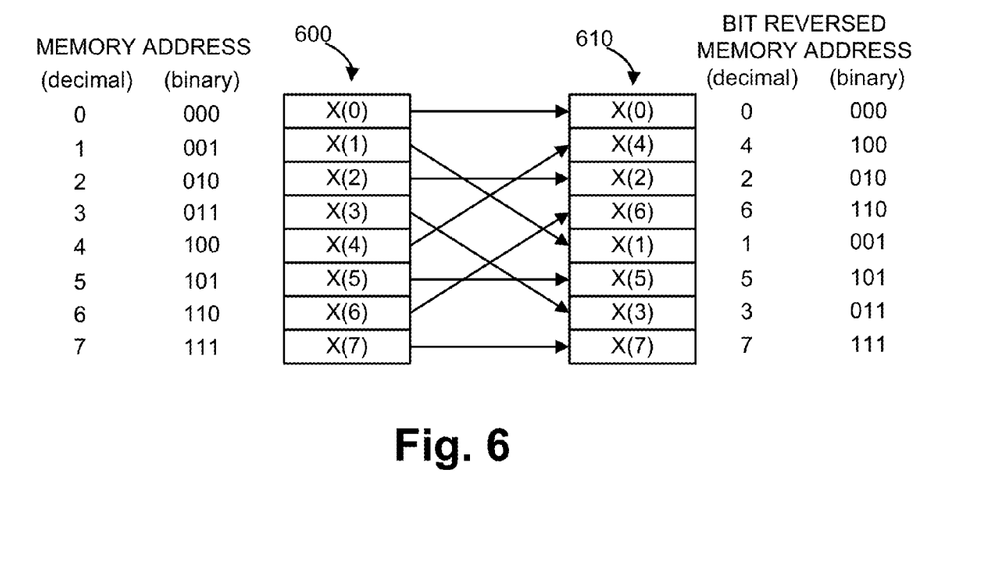
FIG. 6 is a diagram illustrating bit reversal of an exemplary eight sample data stream that is to be transformed via a DFT.

FIG. 6 is a diagram illustrating bit reversal of an exemplary eight sample data stream that is to be transformed via the DFT. As shown in FIG. 6, the input data, in its "natural" order, is shown in column 600, as samples x(0) through x(7). During bit reversal, bit reverse logic 460 may cause the natural order of the input data x to be bit reversed to the order shown in column 610. As shown, the bit-reversal of the indexes is performed on a binary basis, in which, for example, index "001" (decimal one) is stored at index "100" (decimal four) in the bit reversed version.

Memory Partition and Scheduling

Techniques for implementing the memory partitioning and scheduling method in which memory component 410 is used to store the initial data series, as well as intermediate values, to eventually generate the output DFT, will next be described. The description below will be given for a radix-2 FFT, which reads two inputs and generates two outputs for each butterfly operation. In alternative implementations, radix-4 or a higher radix FFTs may be similarly implemented.

In the description below, the FFT will be described for an eight point (i.e., eight input values, N=8) decimation-in-time (DIT) FFT. In practice, the input series that is to be transformed may frequently include many more than eight values. However, for simplicity in the explanation of the concepts described herein, an eight point FFT will be described.

Figure 7:
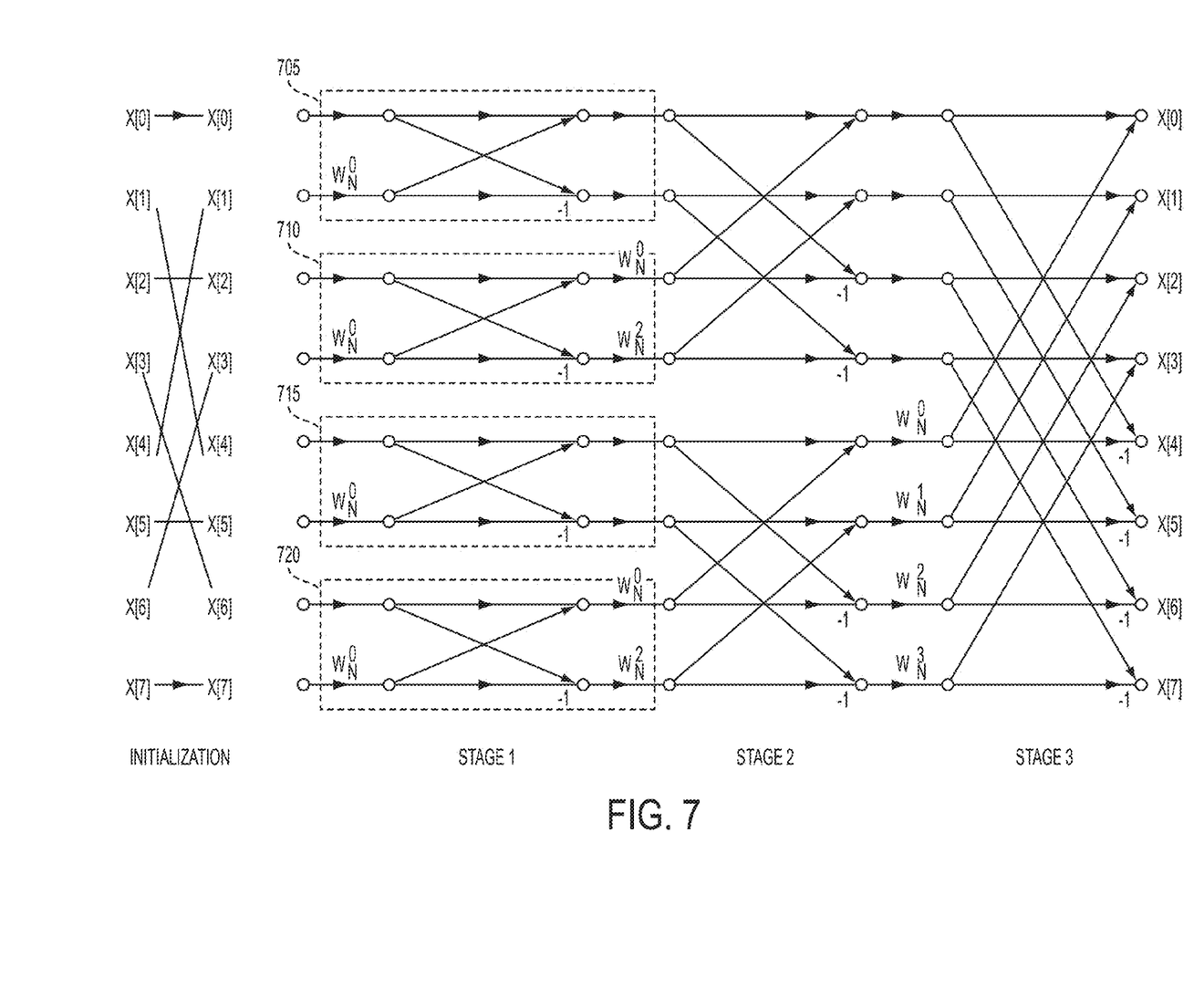
FIG. 7 is a diagram illustrating a series of butterfly operations used in performing an eight point decimation-in-time (DIT) FFT.

FIG. 7 is a diagram illustrating a series of butterfly operations used in performing an eight point DIT FFT. The butterfly operations may be partitioned into M dependency stages, where the number of stages is equal to $\log_2(N)$, where N is the number of input values (e.g., 8). For an eight point DIT FFT (i.e., N=8), M=3. As previously mentioned, indexes of the input value are bit reversed, which is illustrated in FIG. 7 as being performed during initialization.

As shown in FIG. 7, the FFT algorithm includes an initialization and 12 butterfly operations, four in each of butterfly stages one, two, and three for this particular FFT size (size=8) and radix (radix=2). The four butterfly operations in stage one are particularly highlighted in FIG. 7 as dashed-boxes 705, 710, 715, and 720. After stage three, the output values X[0] through X[7] represent the eight FFT coefficients. The ping-pong memory access technique used by FFT 400 may be based on changing stages of the DIT FFT. For example, one of memories 414/418 may be written to during odd stages (stages 1, 3, 5, etc.) while the other of memories 414/418 is written to during even stages (stages 2, 4, etc.).

Figure 8:
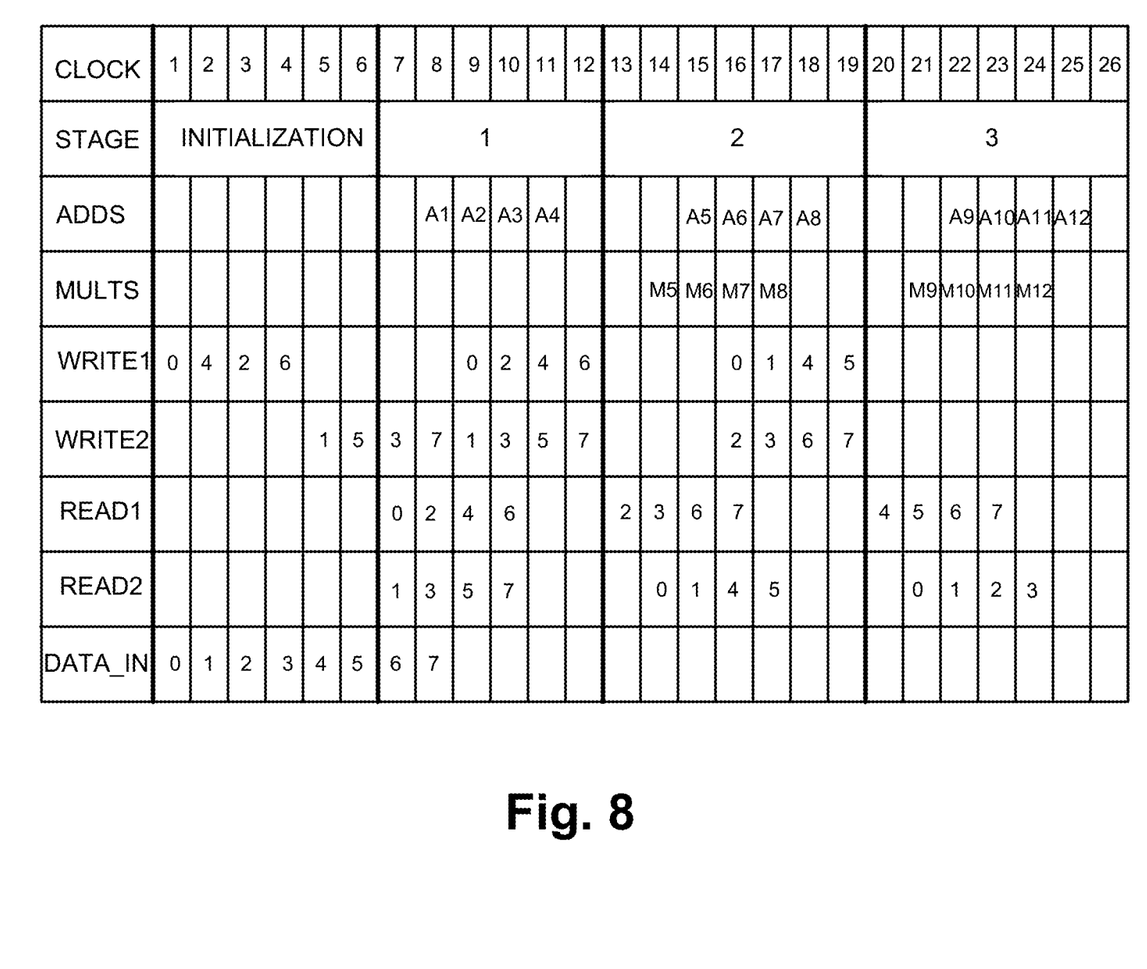
FIG. 8 is a diagram illustrating exemplary timings for read operations, write operations, and butterfly operations to perform an FFT operation for an eight point DIT FFT algorithm.

FIG. 8*a* is a diagram illustrating exemplary timings for read operations, write operations, and butterfly operations to perform an FFT operation for an eight point DIT FFT algorithm. In FIG. 8, Write1/Write2 refer to the bank (bank 1 or 2) at which the data is written, while Read1/Read2 refer to the bank (bank 1 or 2) from which data is read. Although not explicitly shown in FIG. 8, read and write operations may be alternated between memories 414 and 418 in alternating stages (starting at stage 1) of the FFT. For example, during initialization, the bit reversed data may be saved in either of the two memories 414/418. Assume the bit reversed data is stored in memory 414. In stage one, data may be read from banks 1 and 2 of memory 414 and data may be written to banks 1 and 2 of memory 418. In stage two, data may be written to banks 1 and 2 of memory 414 and data may be read from banks 1 and 2 of memory 418. In this manner, intermediate data is read/written in a "ping-pong" manner between memories 414 and 418.

As shown in FIG. 8, stage 0 may be "generally" performed in clock cycles 1-6, stage 1 may be performed in clock cycles 7-12, stage 2 may be performed in clock cycles 13-19, and stage 3 may be performed in clock cycles 20-26. The stages are "generally" indicated because operations in different stages may overlap. For instance, although initialization is shown as occurring in clock cycles 1-6, although the last two data values of the input data stream may not be received and stored by FFT 400 until clock cycles 7 and 8.

During initialization, the input data, "data_in", may be received by bit reverse logic 460 and written to one of memories 414 or 418, assumed to be memory 414 for this example. In clock cycles 1-4, the first four input data values may be written to bank 1 of memory 414 and the second four values, in clock cycles 5-8, may be written to bank 2 of memory 414. The numbers in the rows for write1/write2/read1/read2 in FIG. 8 may represent the row (0-7) in the butterfly diagram shown in FIG. 7. Thus, input data "0" may become the first input to butterfly operation 705 while input data "1" may become the second input to butterfly operation 705.

At the beginning of stage 1 (clock cycle 7), the first two values ("0" and "1") may be read from banks 1 and 2 of memory 414 into butterfly element 420. In clock cycle 8, the first complex addition operation ("A1") may be performed by butterfly element 420 on these first two values. Also in clock cycle 8, the next two values ("2" and "3") may be read from banks 1 and 2 of memory 414 into butterfly element 420. Since the multiplication factor may be one in stage 1, there may be no need for a multiplication. At clock cycle 9, the result of the first butterfly operation (values "0" and "1") may be written to banks 1 and 2 of memory 418. Additionally, in clock cycle 9, the next complex addition ("A2") may be performed and the next two required input values ("4" and "5") may be read from banks 1 and 2 of memory 414. These operations may continue through stage 1, as is shown in FIG. 8.

Stages 2 and 3 are similarly shown in FIG. 8. Additionally, in stages 2 and 3, butterfly element 420 may perform complex multiplications. In clock cycle 14, for example, a complex multiplication may be performed on value "2" (which was read in clock cycle 13), and in clock cycle 15, the result of the multiplication may be added and subtracted from value "0" to obtain the results for the first butterfly operation for stage 2. In clock cycle 16, these results may be written to banks 1 and 2 of memory 414.

Using the scheduling scheme shown in FIG. 8, the total calculation time of the FFT includes the initial delay for bit-reverse and the processing time (stages 1-3). The initial delay is N−3 when N is greater than 8 and N−2 when N is 8. The total calculation cycle using the scheduling scheme of FIG. 8 may be calculated as:

$$T = \begin{cases} N-4+\log_2(N)(N/2+3) & \text{for } N < 8 \\ N-3+\log_2(N)(N/2+3) & \text{for } N = 8 \end{cases}.$$

In the scheduling scheme shown in FIG. 8, the following rules may be followed in writing to and reading from the memory banks in memories 414 and 418 to obtain the FFT transformation: (a) The FFT results are saved in the same one of memories 414/418 where bit-reversed data are stored when the stage number is even. Otherwise the results are saved in the other of memories 414/418; (b) In initialization (for a radix-2 DIT FFT), all the even index (bit-reversed) data are saved in bank1 and odd index data are saved in bank2; (c) For stages 1 to M, results of the addition of butterfly element 420 are saved in bank1 and the results of the subtraction are saved in bank2 Additionally, when reading and writing to memory component 410, an on-line (dynamically calculated) addressing scheme may be used by address generator 430 to ensure data is read and written in a pattern that matches the butterfly diagram of the upcoming stage. The on-line addressing scheme is described in more detail below.

Figure 9:
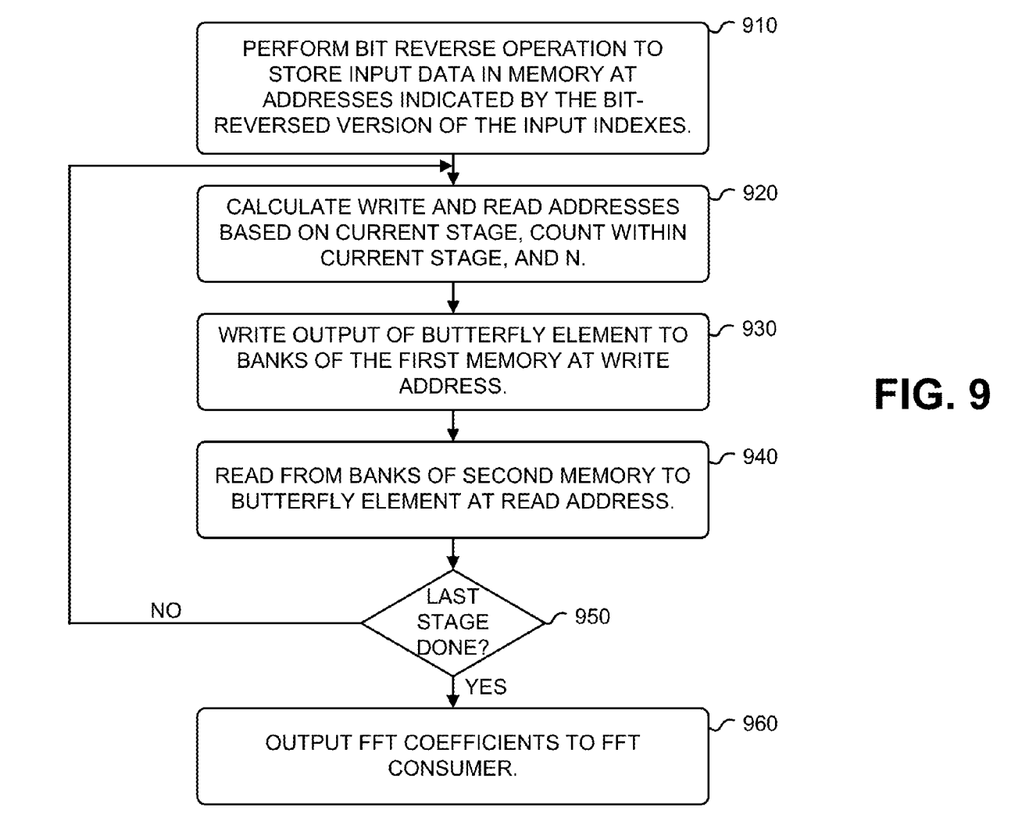
FIG. 9 is a flow chart illustrating exemplary operations for the minimum resource FFT.

FIG. 9 is a flow chart illustrating exemplary operations for the operation of FFT 400. The operations of FIG. 9 may generally be performed by address generator 430, data management logic 440, memory controller 450, and bit reverse logic 460 (FIG. 4).

Bit reverse logic 460 of FFT 400 may receive the incoming data series that is to be transformed. The data series may be of length N and may be received in the natural order corresponding to the sequence, so that the first value received (index zero) is the first value in the series, the second value received (index one) is the second value in the series, etc. Bit reverse logic 460 may perform a bit-reverse operation on the indexes corresponding to the input data values (block 910). Control component 425 may store the input data values in memory component 410 based on the bit-reversed indexes (block 910). More particularly, data management logic 440 may provide the data to memory component 410 on the "DATA" lines, address generator 430 may provide the write addresses to memory component 410, and memory controller 450 may provide the write enable signal. In one implementation, all of the even indexed (bit-reversed) values may be stored in a first bank of one of memories 414/418, such as bank 1, while the odd indexed (bit-reversed) values may be stored in a second bank of the memory.

As previously discussed, for stages 1 through M of the FFT ($M=\log_2 N$), address generator 430 and memory controller 450 may alternate, in different stages, reading from one of memories 414/418 and writing to the other. For the scheduling scheme shown in FIG. 8, the addresses at which to read and write data within the banks of memories 414/418 may be calculated by address generator 430 based on the current stage, a counter value that corresponds to the clock cycle within the stage, and N (block 920). The calculated addresses may be used to write the output of butterfly element 420 to the banks of the one of memories 414/418 designated as the write memory (block 930) and read input values to butterfly element 420 from the banks of the other one of memories 414/418 (block 940). At each clock cycle, the same read address may be submitted to each bank within memories 414/418. Similarly, at each clock cycle, the same write address may be submitted to each bank within memories 414/418.

The operations of blocks 920, 930, and 940 may continue until all stages of the FFT are processed (block 950). In the last stage, the outputs of butterfly component 420 may correspond to the output of FFT 400, which may be output to the FFT consumer (i.e., the next element in the circuit or model) (block 960). The coefficients for the output of FFT 400 may be, for example, received and processed by the next block in model 300 or, when implemented in a physical circuit, by the next element in the circuit.

The read and write addresses calculated in block 920 by address generator 430 may be calculated on-line (i.e., dynamically) by address generator 430 during operation of FFT 400. In one implementation, the circuitry needed to calculate the addresses may be relatively simple. For example, a counter, shift register, and adder may be used to calculate the addresses. The relatively simple construction of address generator 430 may allow for a high frequency clock and a low resource implementation of address generator 430.

One example of a technique for calculating addresses in the scheduling scheme shown in FIG. 8 will now be described. As previously discussed, address generator 430 may generate addresses for banks 416 and 419 in memories 414 and 418, respectively. Each bank may implement N/2 memory storage locations. Accordingly, each address output by address generator 430 may be in the range of one through N/2.

For reading data from memory component 410, assume that the stage number is i and define S as $2^i$. Based on the butterfly diagram and the scheduling scheme shown in FIG. 8, there may be N reads at each stage with N/2 reads from each bank. Each stage may require N/2 number of multiplies and there may be N/2 reads (N/4 at each bank) to fetch the multiplier input (data B as shown in FIG. 5). Similarly, there may be N/2 reads (N/4 at each bank) to fetch the butterfly input (data A in FIG. 5). The memory reading address can be calculated by:

$$\text{read\_address\_A} = j + \frac{k \cdot S}{2} + 1,$$

$$\text{read\_address\_B} = \frac{S}{4} + \text{read\_address\_A},$$

where $$j = 0 \ldots \frac{S}{4} - 1 \text{ and } k = 0 \ldots \frac{N}{S} - 1.$$

The above equations for read_address_A and read_address_B are valid when the stage number is greater than one. In stage one, the read address may be simply equal to the value of a counter that may be implemented in hardware as a finite state machine to control the memory read/write address generation. In one implementation, a counter may be implemented in hardware as a finite state machine to control the memory read/write address generation and potentially as well as butterfly element 420. Rules defining, based on the counter value, when to read to memory, when to perform a multiplication operation by butterfly element 420, when to perform addition operations by butterfly element 420, and when to write to memory are listed in Tables I and II, below. In Tables I and II, Table I is applicable for stages greater than I and Table II is applicable for stage 1.

TABLE I

| | (Stages 2+) |
|---|---|
| Counter Value (cnt) | Operations |
| 1 ... N/2 | reads (one of memories 414/418) |
| 2 ... N/2 + 1 | multiplications (butterfly element 420) |
| 3 ... N/2 + 2 | additions (butterfly element 420) |
| 4 ... N/2 + 3 | writes (the other one of memories 414/418) |

TABLE II

| | (Stage 1) |
|---|---|
| Counter Value (cnt) | Operations |
| 1 ... N/2 | reads (one of memories 414/418) |
| 2 ... N/2 + 1 | additions (butterfly element 420) |
| 3 ... N/2 + 2 | writes (the other one of memories 414/418) |

When using a counter as a state machine in a hardware implementation, index k and j can be calculated in the equations for read_address_A and read_address_B by $$k = \text{floor}\left(\frac{2[cnt-1]}{S}\right)$$

$$j = cnt - 1 - \frac{a \cdot S}{4}$$

where cnt is the count value (1 at the first clock cycle of the stage, 2 at the second clock cycle of the stage, etc.) and floor represents the floor operation, in which floor(x), returns the largest integer not greater than x. Index a can be calculated by:

$a = \text{floor}(4(cnt-1)/S)$

The memory bank number may also be determined by the value of a.

$$\text{bank} = \begin{cases} 1 & a \text{ is even} \\ 2 & a \text{ is odd} \end{cases}$$

An example of the above-described technique for calculating addresses will now be given. Suppose at Stage 2, data pairs {0, 2}, {1, 3}, {4, 6}, and {5, 7} are read from memory to correspond to the four data pairs shown in the butterfly diagram of FIG. 7. S is equal to 4 at Stage 2, the value of k, j, and a and the read addresses that are calculated based on S and the count value (cnt) are listed in Table III.

TABLE III

| | cnt | | | |
|---|---|---|---|---|
| | 1 | 2 | 3 | 4 |
| k | 0 | 0 | 1 | 1 |
| a | 0 | 1 | 2 | 3 |
| j | 0 | 0 | 0 | 0 |
| Read_address_A | 1 | 1 | 3 | 3 |
| Read_address_B | 2 | 2 | 4 | 4 |
| Bank | 1 | 2 | 1 | 2 |

Using the read_address computed in Table III and referring to the read memory content at Stage 2 in Table IV, data with index 0 and 2 are read from bank 1 at clock cycle 1 and data with index 1 and 3 are read from bank 2 at clock cycle 2. When the data with index 2 are sent to the multiplier M5, data with index 0 is saved in a buffer. The multiplication result and the buffer output may be sent to operation A5 at the clock cycle 2, as illustrated in FIG. 8.

TABLE IV

| | Address | | | |
|---|---|---|---|---|
| | 1 | 2 | 3 | 4 |
| Bank1 | 0 | 2 | 4 | 6 |
| Bank2 | 1 | 3 | 5 | 7 |

The write address, write_address, generated by address generator 430 may be directly based on the value of the counter. For instance, in the first write cycle of a stage, the write address may cause writing to the first entry in a bank, in the second write cycle of a stage, the write address may cause writing to the second entry in a bank, etc.

Figure 10:
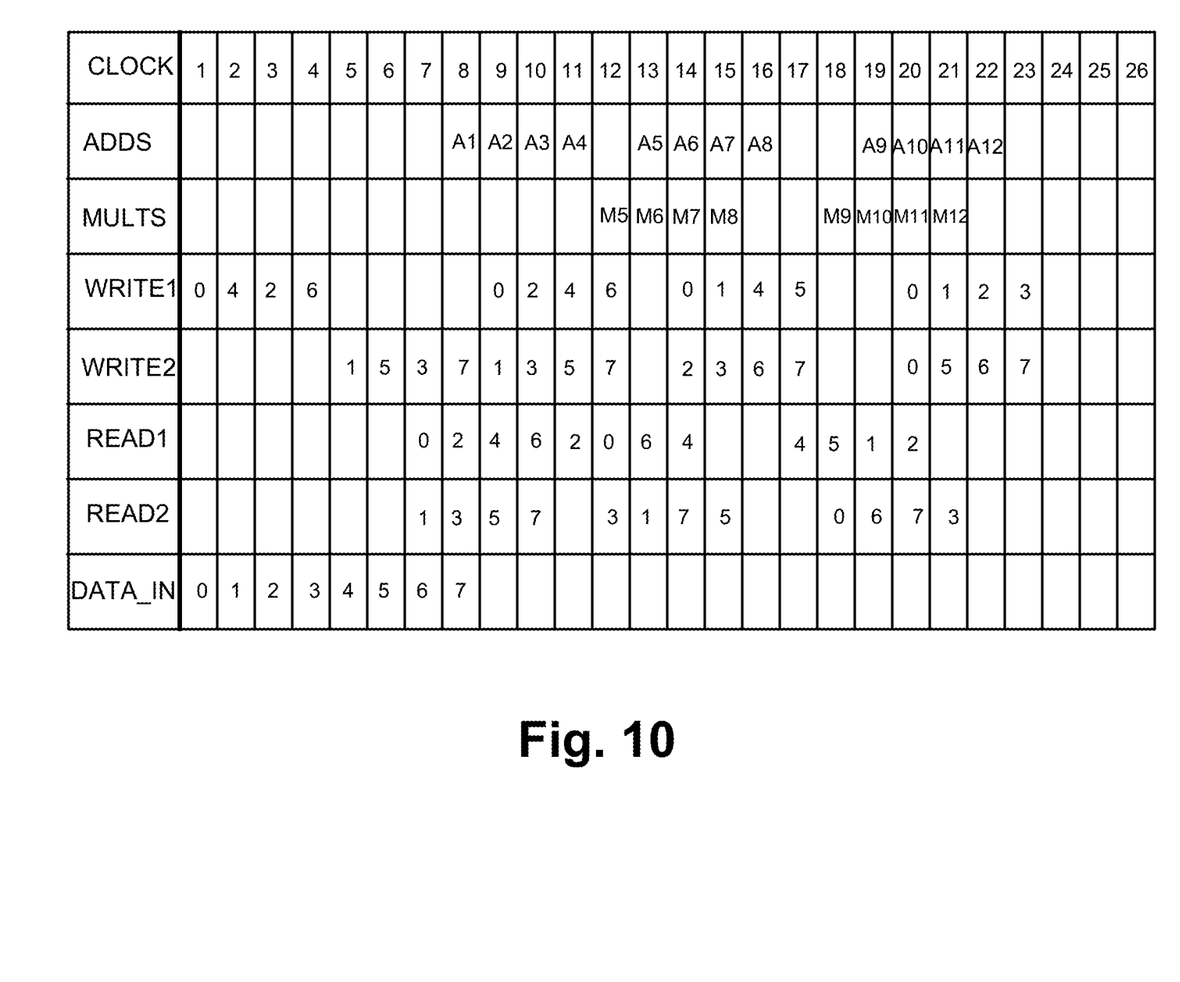
FIG. 10 is a diagram illustrating exemplary timings for read operations, write operations, and butterfly operations to perform an FFT operation for an eight point DIT FFT algorithm in an alternative scheduling scheme.

The scheduling scheme illustrated in FIG. 8 may be thought of as a "loose" scheduling scheme in that the number of clock cycles required to compute the FFT can potentially, in alternative scheduling schemes, be compressed. FIG. 10 is a diagram illustrating exemplary timings for read operations, write operations, and butterfly operations to perform an FFT operation for an eight point DIT FFT algorithm in an alternative scheduling scheme. The scheduling scheme of FIG. 10, based on the number of clock cycles required to compute the FFT, is more efficient than the scheme shown in FIG. 8 (26 cycles for the scheme in FIG. 8 versus 23 cycles for the scheme in FIG. 10). Implementing the scheduling scheme shown in FIG. 10 may require more complex logic for address generator 430, data management logic 440, and/or memory controller 450, but may provide for a faster calculation of the FFT operation.

CONCLUSION

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 9, the order of the acts may be modified in other implementations. Further, non-dependent acts may be performed in parallel.

It will be apparent that embodiments, as described herein, may be implemented in many different forms of software, firmware, wetware, and hardware in the implementations illustrated in the figures. The actual software code or specialized control hardware used to implement embodiments described herein is not limiting of the invention.

It should be noted that one or more computer-readable media may store computer-executable instructions that when executed by a processing unit, such as processing unit 220, may perform various acts associated with one or more embodiments of the invention. The computer-readable media may be volatile or non-volatile and may include, for example, flash memories, removable disks, non-removable disks, and so on.

It should be further noted that various electromagnetic signals, such as wireless signals, electrical signals carried over a wire, optical signals carried over optical fiber, etc., may be encoded to carry computer-executable instructions, configured to implement one or more embodiments of the invention, on a network, such as, for example, network 130.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
    during a stage of a Fast Fourier Transform (FFT) operation:
        determining data that includes:
            a value of a counter during the stage of the FFT operation,
            a stage value associated with the stage of the FFT operation, and
            a quantity of input values of a plurality of inputs values,
                the data being determined by a device;
        performing, based on the stage value and the quantity of input values, one or more shift operations and one or more addition operations on the value of the counter, during the stage of the FFT operation, to determine an address,
            the one or more shift operations and the one or more addition operations being performed by the device;
        determining, based on the stage value, to read the plurality of input values from a first plurality of memory banks and to write a plurality of output values to a second plurality of memory banks,
            the second plurality of memory banks being different from the first plurality of memory banks, and
            determining to read the plurality of input values from the first plurality of memory banks and to write the plurality of output values to the second plurality of memory banks being performed by the device;
        reading, based on the address, the plurality of input values from a first plurality of memory banks,
            the plurality of input values being read by the device;
        performing, using the plurality of input values, a calculation of the FFT operation to determine the plurality of output values,
            the calculation being performed by the device; and
        writing, based on the address, the plurality of output values to the second plurality of memory banks,
            the plurality of output values being written by the device, and
            the quantity of input values being the same as a quantity of output values of the plurality of output values.

2. The method of claim 1, where determining to read the plurality of input values from the first plurality of memory banks and to write the plurality of output values to the second plurality of memory banks includes:
    determining that the stage value is an odd value, and
    determining to read the plurality of input values from the first plurality of memory banks and to write a plurality of output values to the second plurality of memory banks based on the stage value being the odd value.

3. The method of claim 1, further comprising:
    receiving a plurality of indexed data items,
        the plurality of indexed data items including the plurality of input values;
    generating a bit reversed index based on indexes of the plurality of indexed data items; and
    storing the plurality of indexed data items, including the plurality of input values, in the first plurality of memory banks based on the bit reversed index.

4. The method of claim 3, where the FFT operation includes a radix-2 decimation-in-time (DIT) FFT; and
    where storing the plurality of indexed data items includes:
        storing an indexed item, of the plurality of indexed data items, in a particular memory bank, of the first plurality of memory banks, based on whether an index associated with the indexed item is an even number or an odd number.

5. The method of claim 1, where the FFT operation includes a radix-2 decimation-in-time (DIT) FFT,
    where the quantity of input values is two, and
    where the quantity of output values is two.

6. The method of claim 1, where a quantity of memory banks included in the first plurality of memory banks is equal to the quantity of input values.

7. The method of claim 1, where the stage of the FFT operation is a first stage of the FFT operation, the method further comprising:
    determining, for a second stage of the FFT operation, to read a plurality of input values from the second plurality of memory banks and to write a plurality of output values to the first plurality of memory banks based on the second stage of the FFT operation following the first stage of the FFT operation.

8. A device comprising:
    one or more processors to:
        during a stage of a Fast Fourier Transform (FFT) operation:
            determine data that includes:
                a value of a counter during the stage of the FFT operation,
                a stage value associated with the stage of the FFT operation, and
                a quantity of input values of a plurality of inputs values; and
            perform, based on the stage value and the quantity of input values, one or more shift operations and one or more addition operations on the value of the counter, during the stage of the FFT operation, to determine an address;
            determine, based on the stage value, to read the plurality of input values from a first plurality of memory banks and to write a plurality of output values to a second plurality of memory banks,
                the second plurality of memory banks being different from the first plurality of memory banks;
            read, based on the address, the plurality of input values from the first plurality of memory banks;
            perform, using the plurality of input values, a calculation of the FFT operation to determine the plurality of output values; and
            write, based on the address, the plurality of output values to the second plurality of memory banks,
                the quantity of input values being the same as a quantity of output values of the plurality of output values.

9. The device of claim 8, where, when determining to read the plurality of input values from the first plurality of memory banks and to write the plurality of output values to the second plurality of memory banks, the one or more processors are to:
  determine that the stage value is an odd value, and
  determine to read the plurality of input values from the first plurality of memory banks and to write the plurality of output values to the second plurality of memory banks based on the stage value being the odd value.

10. The device of claim 8, where the one or more processors are further to:
  receive a group of indexed data items,
    the group of indexed data items including the plurality of input values;
  generate a bit reversed index based on indexes of the group of indexed data items; and
  store the group of indexed data items, including the plurality of input values, in the first plurality of memory banks based on the bit reversed index.

11. The device of claim 10, where the FFT operation includes a radix-2 decimation-in-time (DIT) FFT; and
  where, when storing the group of indexed data items, the one or more processors are to:
    store an indexed item, of the group of indexed data items, in a particular memory bank, of the first plurality of memory banks, based on whether an index associated with the indexed item is an even number or an odd number.

12. The device of claim 8, where the FFT operation includes a radix-2 decimation-in-time (DIT) FFT,
  where the quantity of input values is two, and
  where the quantity of output values is two.

13. The device of claim 8, where a quantity of memory banks included in the first plurality of memory banks is equal to the quantity of input values.

14. The device of claim 8, where the stage of the FFT operation is a first stage of the FFT operation; and
  where the one or more processors are further to:
    determine, for a second stage of the FFT operation, to read a plurality of input values from the second plurality of memory banks and to write a plurality of output values to the first plurality of memory banks based on the second stage of the FFT operation following the first stage of the FFT operation.

15. A non-transitory computer-readable medium storing instructions, the instructions comprising:
  one or more instructions that, when executed by one or more processors, cause the one or more processors to:
    during a stage of a Fast Fourier Transform (FFT) operation:
      determine data that includes:
        a value of a counter during the stage of the FFT operation,
        a stage value associated with the stage of the FFT operation, and
        a quantity of input values of a plurality of inputs values; and
      perform, based on the stage value and the quantity of input values, one or more shift operations and one or more addition operations on the value of the counter, during the stage of the FFT operation, to determine an address;
      determine, based on the stage value, to read the plurality of input values from a first plurality of memory banks and to write a plurality of output values to a second plurality of memory banks,
        the second plurality of memory banks being different from the first plurality of memory banks;
      read, based on the address, the plurality of input values from the first plurality of memory banks;
      perform, using the plurality of input values, a calculation of the FFT operation to determine the plurality of output values; and
      write, based on the address, the plurality of output values to the second plurality of memory banks,
        the quantity of input values being the same as a quantity of output values of the plurality of output values.

16. The non-transitory computer-readable medium of claim 15, where the one or more instructions to determine to read the plurality of input values from the first plurality of memory banks and to write the plurality of output values to the second plurality of memory banks include:
  one or more instructions that, when executed by the one or more processors, cause the one or more processors to:
    determine that the stage value is an odd value, and
    determine to read the plurality of input values from the first plurality of memory banks and to write the plurality of output values to the second plurality of memory banks based on the stage value being the odd value.

17. The non-transitory computer-readable medium of claim 15, where the instructions further comprise:
  one or more instructions that, when executed by the one or more processors, cause the one or more processors to:
    receive a group of indexed data items,
      the group of indexed data items including the plurality of input values;
    generate a bit reversed index based on indexes of the group of indexed data items; and
    store the group of indexed data items, including the plurality of input values, in the first plurality of memory banks based on the bit reversed index.

18. The non-transitory computer-readable medium of claim 17, where the FFT operation includes a radix-2 decimation-in-time (DIT) FFT; and
  where the one or more instructions to store the group of indexed data items include:
    one or more instructions that, when executed by the one or more processors, cause the one or more processors to:
      store an indexed item, of the group of indexed data items, in a particular memory bank, of the first plurality of memory banks, based on whether an index associated with the indexed item is an even number or an odd number.

19. The non-transitory computer-readable medium of claim 15, where the FFT operation includes a radix-2 decimation-in-time (DIT) FFT,
  where the quantity of input values is two, and
  where the quantity of output values is two.

20. The non-transitory computer-readable medium of claim 15, where the stage of the FFT operation is a first stage of the FFT operation; and
  where the instructions further comprise:
    one or more instructions that, when executed by the one or more processors, cause the one or more processors to:
      determine, for a second stage of the FFT operation, to read a plurality of input values from the second plurality of memory banks and to write a plurality of output values to the first plurality of memory banks based on the second stage of the FFT operation following the first stage of the FFT operation.

\* \* \* \* \*